United States Patent [19]
Taylor

[11] Patent Number: 5,844,856
[45] Date of Patent: Dec. 1, 1998

[54] DUAL PORT MEMORIES AND SYSTEMS AND METHODS USING THE SAME

[75] Inventor: Ronald T. Taylor, Grapevine, Tex.

[73] Assignee: Cirrus Logic, Inc., Fremont, Calif.

[21] Appl. No.: 666,815

[22] Filed: Jun. 19, 1996

[51] Int. Cl.$^6$ .................................................. G11C 8/00
[52] U.S. Cl. ................................ 365/230.05; 365/230.03
[58] Field of Search ..................... 365/230.05, 230.03, 365/220

[56] References Cited

U.S. PATENT DOCUMENTS

| | | | |
|---|---|---|---|
| 4,893,281 | 1/1990 | Hashimoto | 365/230 |
| 4,987,559 | 1/1991 | Miyauchi et al. | 365/189.04 |
| 5,121,360 | 6/1992 | West | 365/730.03 |
| 5,305,284 | 4/1994 | Iwase | 365/238.5 |
| 5,319,603 | 6/1994 | Watanabe | 365/230.05 |
| 5,377,154 | 12/1994 | Takasugi | 365/221 |
| 5,390,139 | 2/1995 | Smith | 365/49 |
| 5,568,431 | 10/1996 | Rao | 365/189.12 |
| 5,621,902 | 4/1997 | Cases et al. | 395/309 |
| 5,636,174 | 6/1997 | Rao | 365/230.03 |
| 5,649,161 | 7/1997 | Andrade et al. | 395/494 |
| 5,687,132 | 11/1997 | Rao | 365/230.03 |

*Primary Examiner*—David Nelms
*Assistant Examiner*—Hoai V. Ho
*Attorney, Agent, or Firm*—James J. Murphy; Steven A. Shaw

[57] ABSTRACT

A memory 20 includes a first array 100 and a second array 102 of memory cells. A first data port 118 allows for the exchange of data with the first array 100 and a second data port 120 allows for the exchange of data with the second array 102. Memory system 20 also includes a circuitry 122 for controlling data exchanges in a selected mode with the first array 100 via the first data port 118 and with the second array 102 via the second data port 120, the exchanges with the first and second arrays 100 and 102 being asynchronous.

22 Claims, 4 Drawing Sheets

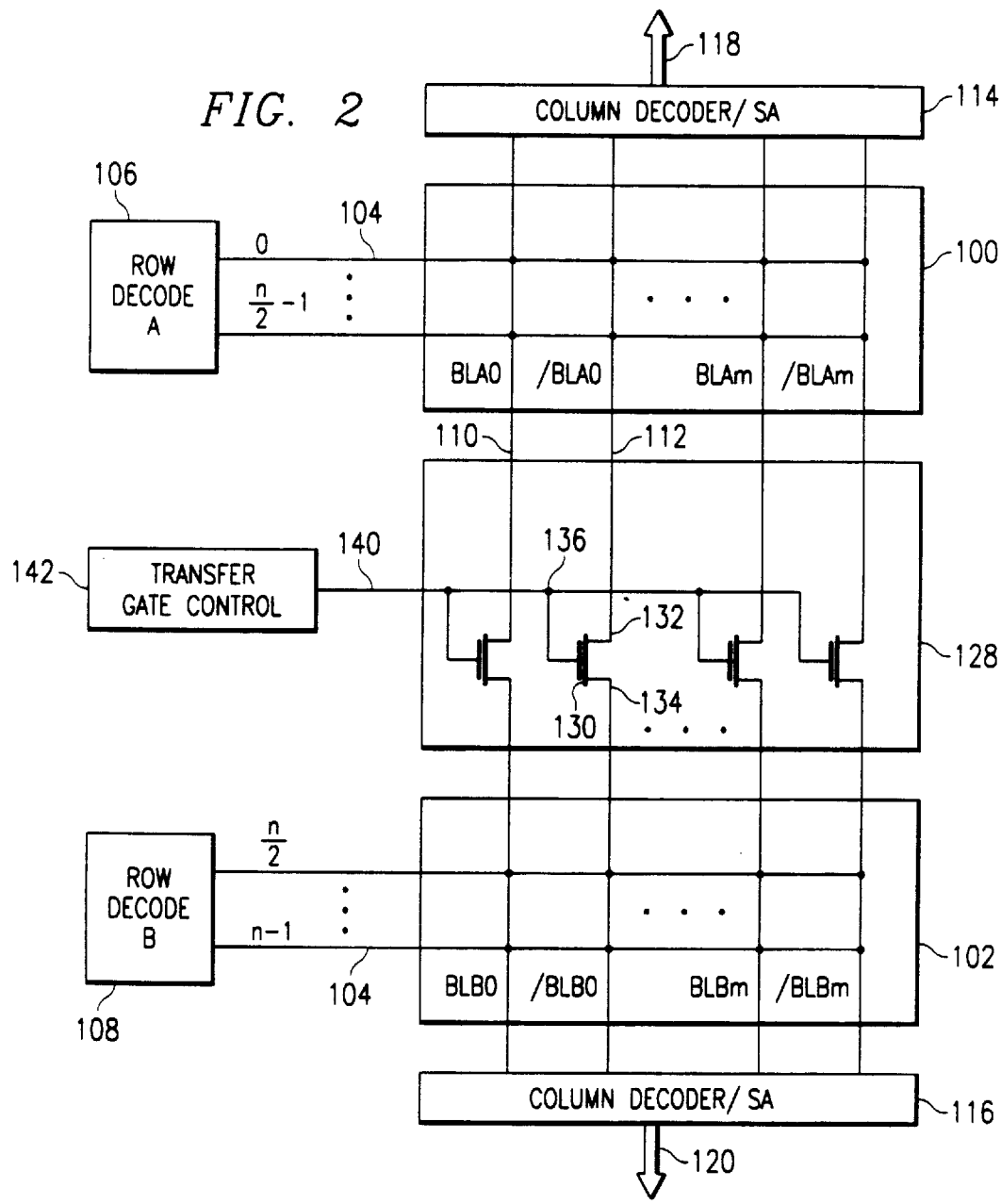

DUAL PORT MEMORIES AND SYSTEMS AND METHODS USING THE SAME

CROSS-REFERENCE TO RELATED APPLICATIONS

The following co-pending and co-assigned applications contain related information and is hereby incorporated by reference:

U.S. patent application Ser. No.08/548,752 (Attorney Docket Number 2836-PO14US), entitled MULTIPLE-BANK MEMORY ARCHITECTURE AND SYSTEMS AND METHODS USING THE SAME, filed Oct. 26, 1995; and U.S. patent application Ser. No. 08/666,814, now U.S. Pat. No. 5,687,132 (Attorney Docket Number 2836-PO51US), entitled MULTIPLE-BANK MULTI-PORT MEMORIES AND SYSTEMS AND METHODS USING THE SAME, filed simultaneously with this application.

FIELD OF THE INVENTION

The present invention relates broadly to computer processing subsystems and in particular to dual port memories and systems and methods of using the same.

BACKGROUND OF THE INVENTION

A typical computer processing system includes generally a central processing unit (CPU), a main memory, and other hardware devices, such as storage devices, keyboards, display devices and network controllers. All of these components are generally connected together through at least one bus. In addition, an I/O (input or output or both) subsystem, typically comprised of various I/O subsystem devices distributed throughout the system, is included which controls the interconnect between the computer bus(es), CPU, memory and other hardware devices.

Among other things, the I/O subsystem mediates the transfer of data between hardware devices, which may vary for example in speed, supply voltage, and/or bus protocol, and accounts for limitations in the computer processing system standard architecture. Recently, however, the basic I/O subsystem used in the industry has needed modifications, in part because advances in the performance of the CPU, memory and other hardware devices have not occurred uniformly. Despite such differences in hardware performance, there remains a desire to maintain various industry standards in the computer processing system architecture and as a result data transfer rates still vary significantly within a given system.

The I/O subsystem is typically made up of various controller circuits and memory caches/buffers which operate independently as intermediaries between the computer processing system components. Typical I/O subsystem controller circuits may vary in configuration and function according to specific applications, but in general are required to adapt data structures and/or to translate between selected hardware protocols to maintain efficient communication within the system. Also, although the I/O subsystem memory cache and buffers may vary in structure and operation according to specific applications, they generally must transfer data at rates that meet or exceed the data transfer rates of the hardware devices connected therewith. The memory cache may also cooperate with an associated controller circuit in adapting the data structure.

The core logic is a particular I/O subsystem device which generally ties the other hardware devices together. Early core logic designs included direct memory access (DMA) controllers, interrupt control devices and a timer-counter device. Later, the industry standard architecture (ISA) bus controller and bus buffer, previously separate I/O subsystem devices, were combined with the core logic chip set. Present core logic designs for a peripheral component interconnect (PCI) bus architecture additionally include the CPU local bus to PCI bridge, a PCI to ISA bridge, to maintain compatibility with earlier ISA bus architectures, and system memory and cache controllers.

The implementation of the PCI bus bridges in the core logic are intended to provide a standard architecture for interfacing the CPU with other hardware devices, such as the system memory controller, the cache controller and the video display adapter/controllers. These hardware devices were previously connected directly to the CPU local bus, and, because CPU local buses are different for each CPU, upgrading the CPU therefore required upgrading all of the hardware device connections to the CPU local bus. Presently since these hardware devices connect with the CPU local bus through the core logic and PCI bus, upgrading the CPU merely requires replacing the CPU chip and the CPU local bus to PCI bridge chip. However, while providing upgrade capabilities in the system architecture, the present PCI bus and core logic architecture creates a potential bottleneck by channeling all information to and from the CPU through the core logic and the CPU local bus to PCI bridge chip.

The CPU communicates through the core logic to handle management of the system buses and execute various software applications. Currently, most industry computer buses are managed by the CPU. In this capacity, the CPU is the system master and generally provides overall system control in conjunction with the software operating system. The CPU, in addition to managing the data transfers on the buses still handles the execution of the software operating system and software applications. To alleviate the potential bottleneck created by the CPU local bus to PCI bridge, it would be desirable to transfer some CPU management function to the core logic.

In sum, with the advent of high performance processors, memories and other hardware devices, the differences between the performance capabilities of these hardware devices has increased. The need has therefore arisen for improvements to the I/O subsystem and I/O subsystem devices, in particular the core logic, to minimize performance conflicts between devices performing independent tasks and/or operating at different speeds.

In addition, advances in software complexity and the advent of multimedia applications have substantially increased the demand for high speed and large volume data transfers which require channeling large amounts of data between storage devices and display devices and/or sound devices. Often times, the requirements of multimedia applications conflict with the computer processing system architecture which was not designed for such applications. In the past, the CPU handled all data transfers between various computer processing system devices. In order to meet the data transfer demands of multimedia applications, some historical CPU tasks have been delegated to I/O subsystem controllers, but the need still exists for improving the transfer rates of data through the I/O subsystem

SUMMARY OF THE INVENTION

According to one embodiment of the principles of the present invention, a memory system is provided which includes first and second arrays of memory cells. A first data port is provided for exchanging data with the first array and a second data port is provided for exchanging data with the second array. The memory system also includes circuitry for controlling data exchanges in a selected mode with the first array via the first data port and with the second array via the second data port, the exchanges with the first and second arrays being asynchronous.

According to another embodiment of the principles of the present invention, an I/O subsystem device is provided. A subsystem control circuit is included which has a first control port for receiving a first set of addresses and control signals and a second control port for receiving a second set of addresses and control signals. First and second arrays of memory cells are included in the subsystem, each organized in rows and columns, with each row associated with a wordline and each column associated with a bitline. A transfer gate is disposed between a bitline in the first array and a corresponding one of the bitlines in the second array, the transfer gate being controlled by the subsystem control circuit. The I/O subsystem additionally includes first and second data ports for exchanging data with the first and second memory arrays respectively. The I/O system is operable in a first mode to provide asynchronous access to the first and second arrays through the first and second data ports in response to independent sets of addresses and control signals presented to the first and second control ports. The I/O system is operable in a second mode to transfer data from selected cells of a selected one of the arrays to an other one of the arrays in response to addresses and control signals presented at a selected one of the control ports.

According to an additional embodiment of the principles of the present invention, an I/O subsystem device is provided for use in a processing system having first and second processing devices. The I/O subsystem includes a subsystem control circuitry and first and second arrays of memory cells having wordlines and bitlines. A transfer gate is coupled between each of the bitlines of the first array and corresponding ones of the bitlines of the second array, the transfer gate also coupled to the subsystem control circuitry. A first row decoder is coupled between the subsystem control circuitry and the wordlines of the first array and a second row decoder is coupled between the subsystem control circuitry and the wordlines of the second array. The first column decoder is coupled between the subsystem control circuitry and the bitlines of the first array and a second column decoder is coupled between the subsystem control circuitry and the bitlines of the second array. The I/O subsystem device includes first and second data ports coupled to the first and second column decoders for exchanging data with the first and second processing devices. The subsystem control circuitry includes a first array controller coupled to the first column decoder and the first row decoder and a second array controller coupled to the second column decoder and the second row decoder. The first and second array controllers selectively allow independent accesses to the first and seconds arrays during a first mode via the first and second data ports.

The principles of the present invention are also embodied in methods of operating memory devices. For example, a method is provided for operating a memory device including first and second arrays of memory cells. During a first mode, the first array is accessed through a first data port in response to addresses and control signals received at a first control port. During the first mode, the second array is accessed through a second data port in response to addresses and control signals received at a second control port. During a second mode, data is transferred from the first array to the second array in response to addresses and control signals received at a selected one of the first and second control ports.

A more complete understanding of the present invention and other objects, aspects and advantages thereof will be gained from a consideration of the following description of the preferred embodiments read in conjunction with the accompanying drawings provided herein.

BRIEF DESCRIPTION OF THE DRAWINGS

FIG. 2 is a detailed block diagram of a dual port memory of the FIG. 1 embodiment of the present invention including a circuit diagram of a transfer gate;

FIG. 3 is a map of an exemplary control register for use in the command and control of the transfer of data in the memory of FIG. 2;

DESCRIPTION OF THE PREFERRED EMBODIMENTS

Figure 1:
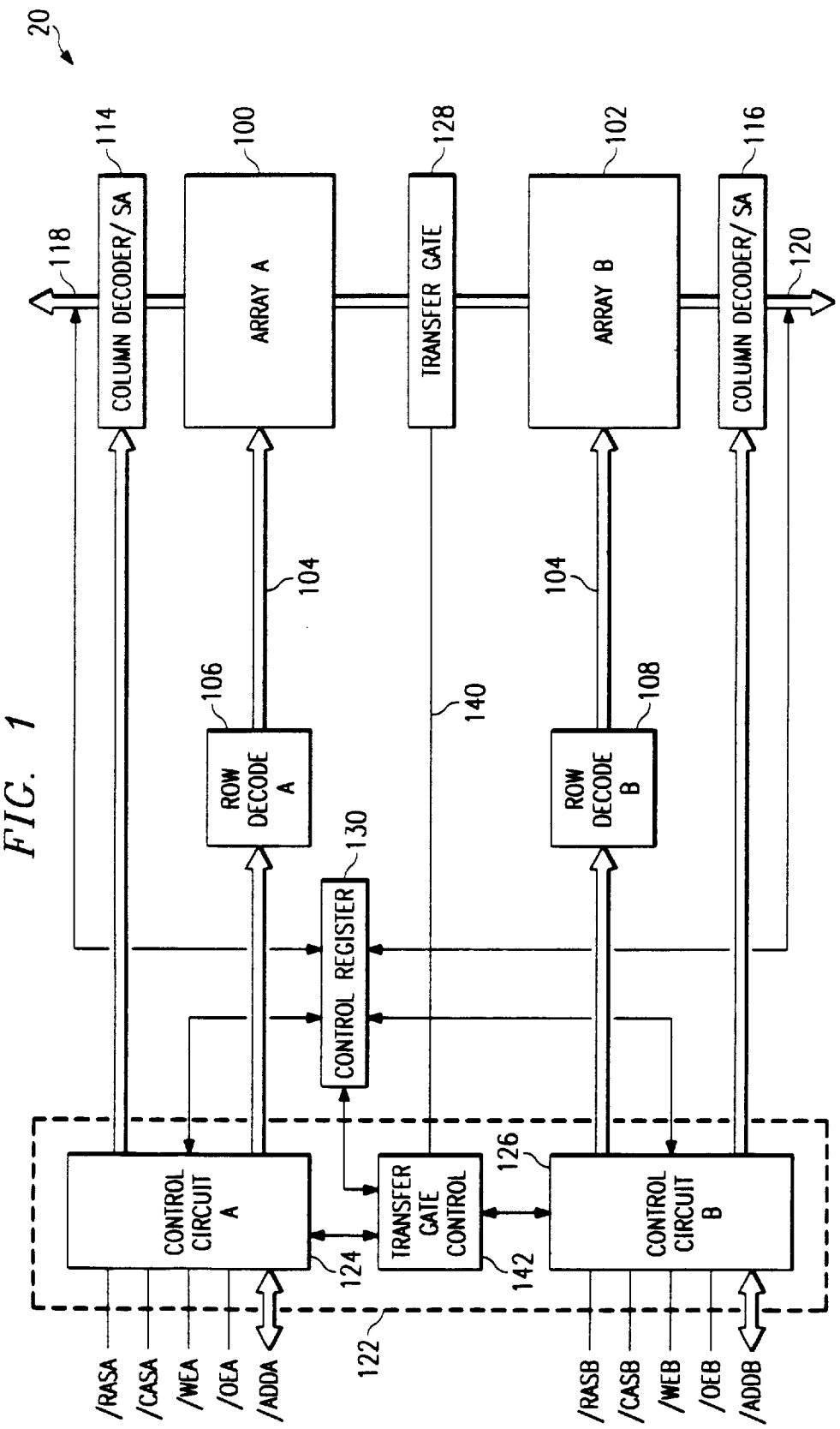
FIG. 1 is a functional block diagram of a preferred dual port memory embodying the present invention.

As shown in the drawings for purposes of illustration, the invention is embodied in a dual port memory device, indicated generally by the reference number 20, for reading and writing data through two separate data ports. Memory 20 includes an array of n number of rows and m number of columns of memory cells comprising an upper bank or first subarray 100 and a lower bank or second subarray 102. In the preferred embodiment, the cells are dynamic random access memory (DRAM) cells. In alternate embodiments other memory devices, such as static random access memory (SRAM) cells may be used.

The size and organization of first and second subarrays 100 and 102 may vary according to the intended use of the I/O subsystem; however, some basic relationships are preferably maintained. In general, the subarrays preferably have an equal or m number of columns of memory cells. In contrast, the number of rows of each subarray 100/102 may vary; however, those skilled in the art will appreciate that addressing advantages are achieved when the number of rows are equal. In the preferred embodiment, first subarray 100 includes rows 0 to $$\frac{N}{2} - 1$$

and second subarray 102 includes rows n/2 to n−1, where 0 to n equals n number of rows. For purposes of illustration, a folded bitline architecture will be described in detail.

Each row of the first and second subarrays 100 and 102 is associated with a conductive wordline 104 (FIG. 2). The wordlines of the first subarray are coupled to and controlled by a first row decoder circuit 106 and the wordlines of the second subarray are coupled to and controlled by a second row decoder circuit 108.

As shown for purposes of illustration, the columns of cells of the first and second subarrays are arranged as pairs of folded half-bitlines. For a given row, one half-bitline 110 carries "true logic" level data and the other half-bitline 112 is latched to the complement of that data by the corresponding sense amplifier. As illustrated in FIG. 2, bitline pairs BLA0 and /BLA0 to BLAm and /BLAm, respectively, are contained within first subarray 100 and bitline pairs BLB0 and /BLBL to BLBm /BLBm are contained within second subarray 102. The bitlines of the first subarray 100 are coupled conventionally to a first column decoder 114 and sense amplifier circuit. The bitlines of the second subarray 102 are coupled conventionally to a second column decoder 116 and sense amplifier circuit.

The first and second column decoder and sense amplifier circuits 114 and 116 are preferably conventional in design. As is known in the art, column decoders/sense amplifiers 114 and 116, as well as row decoders 106 and 108 are preferably constructed from dynamic circuitry, although static circuitry could alternatively be used. The first column decoder and sense amplifier circuit 114 connects conventionally to a first data port 118 (port A) and the second column decoder and sense amplifier circuit 116 connects conventionally to a second data port 120 (port B). For brevity and clarity, the conventional data input/output buffers and latches associated with data ports 118 and 120 are not shown in FIGS. 1 and 2.

A memory control circuit 122 connects to the row and column decoders of the first and second subarrays 100 and 102 and is operative to enable reading, writing and refreshing of data with each subarray 100/102 via the respective data ports independently and asynchronously in a conventional manner. To accomplish this task, the control circuit may include first and second controller circuits 124 and 126, each controller circuit receiving addresses and conventional DRAM control signals including a row address strobe (/RAS), a column address strobe (/CAS), a write enable (WE) signal and an output enable (/OE) signal from a corresponding external device. In the preferred embodiment, the first and second controller circuits 124 and 126, row decoders 106 and 108 and sense amplifier/column decoders 114 and 116 are generally operative to control the independent reading and writing of data through the corresponding data ports 118 and 120, as well as the performance of refresh cycles for the respective first and second subarrays in a conventional manner. The structure and operation of these components for such operations are more fully described in U.S. patent application Ser. No. 08/548,752, now U.S. Pat. No. 5,687,132 (Attorney Docket Number 2836-PO14US), which is incorporated herein by reference.

Turning now to the preferred features of the present invention, the dual port memory further includes a transfer gate 128 for selectively connecting corresponding bitlines (half-bitline pairs) of the first and second subarrays. For example, half-bitline pair BLA0 and /BLA0 can be selectively connected by transfer gate 128 to half-bitline pair BLB0 and /BLB0, and so on. The transfer gate 128 is preferably a two state gate capable of selectively switching between an open circuit position and closed circuit position. The transfer gate 128 is connected to and controlled by memory controller circuit 122. For purposes of illustration, the transfer gate 128 may be a series of NMOS type transistors 130 connected in parallel, each having a source terminal 132 connected to a corresponding half-bitline in the first subarray and a drain terminal 134 connected to the corresponding half-bitlines in the second subarray. The gates 136 of the transistors are preferably connected in parallel to a transfer lead 140. Transfer lead 140 selectively provides a "true logic" high or low signal to the gates of the transistors. In applying the NMOS transistor type example, a high signal creates a closed circuit allowing current to flow between the respective first and second subarray bitlines and a low signal creates an open circuit isolating the bitlines of the respective first and second subarrays.

The controller circuit 122 includes a transfer gate controller circuit 142. Transfer gate controller circuit 142 connects to the transfer gate lead 140 and the first and second controller circuits 124 and 126. Transfer gate controller circuit 142 generally arbitrates data transfers between the first and second subarrays and between each subarray 100 and 102 and the corresponding data ports 118 and 120. Specifically, transfer gate controller 142 handles the timing and sequencing of signals between controllers 124 and 126 when a data transfer has been requested. Preferably, a data transfer between the first and second subarrays can occur at the request of either the first or second controller circuit.

During the normal operating mode, data arrays 100 (Array A) and 102 (Array B) are accessed independently and asynchronously through data ports 118 and 120 in response to independently generated addresses and DRAM control signals presented at control circuits 124 and 126 respectively. Specifically, Array A accesses are controlled by /RASA, /CASA, /WEA and /OEA and the addresses appearing on address port ADDA and Array B accesses are controlled by /RASB, /CASB, /WEB and /OEB and the addresses appearing on address port ADDB. In each case, the DRAM control signals perform the conventional functions typically associated therewith. For example, each /RAS signal times the precharge and active cycles of the corresponding array and latches in row addresses presented to the corresponding address port. The /CAS signals time input of the column addresses and control the column decoder outputs. The /OE and /WE signals similarly control the output and input data latches and buffers in a conventional manner. The use of independent control signals and addresses in the normal mode allow Array A and Array B to support at least two asynchronously operating devices. In particular, by appropriate selection of the timing of control signals and addresses, Arrays A and B can advantageously support devices operating at substantially different clock rates In the transfer mode, the timing of the accesses to Arrays A and B is closely timed or locked. Preferably, either the addresses and control signals presented at control circuit A (124) (ADDA, /RASA, /CASA, /OEA, /WEA) or those presented at control circuit B (126) (ADDB, /RASB, /CASB, /OEB or /WEB) are used to control both banks.

In the preferred embodiment, transfer gate controller circuit 142 selects control of the transfer from the signals appearing at Control Circuits A and B as a function of the request for a transfer access. Thus, if the device coupled to Control Circuit A ("System A") presents its request for transfer first, than the "A set" of control signals and addresses control the operation to the exclusion of the "B set" control signals and addresses from the device coupled to Control Circuit B ("System B"), and vice versa.

During a transfer, the row address from the controlling device is preferably used to access both banks, although an offset may be added to the received controlling address to allow for a change in row between the source and destination arrays. It should also be noted that after the initial address is received from one of the external devices, multiple row transfers may be implemented with internal row address incrementation, using for example, the internal refresh counter. In this case, either the /RAS signal from the external controlling device or an internally generated /RAS signal would be used to time the active and precharge cycles for one or both subarrays.

Data transfers between the first and second subarrays 100 and 102 advantageously rely on the refresh circuitry of the sense amplifier circuits of the sending and receiving subarrays 100/102. The timing of the transfer of data from one row in a given subarray, assume for discussion subarray A, to the second subarray, in this case subarray B, will be discussed in detail below in conjunction with FIG. 4. Generally, charge from the cells of the selected row in sending array A results in a small change in the charge on the corresponding subarray half-bitlines. The sense amplifiers in sending subarray A then sense the change in charge and latch the subarray A half-bitlines and their complimentary half-bitlines to the appropriate full logic voltage levels. Besides preparing for the transfer of data to a corresponding row, the sensing and latching operations in the sending subarray refresh the data in the addressed (source) row. Once the sense amplifiers have latched the sending half-bitlines, the transfer gate can be closed and charge sent to the bitlines of receiving subarray B. After a delay, the receiving subarray half-bitlines are sensed and latched. The data then overwrites the data of the cells of the selected row in subarray B.

As stated previously, the transfer gate controller circuit 142 may vary in structure and/or operation depending upon the application. Among other things, the complexity of the I/O subsystem of the associated system may correspondingly dictate the complexity of the transfer gate controller 142. The basic operation of transfer gate controller circuit 142 can be described as follows.

Assume an I/O subsystem where a dual port memory of the present invention is used as a unidirectional buffer for selectively transferring data from System A coupled to port A 118 to System B coupled to port B 120. Specific examples will be discussed further below. The setting of a bit in control registers within transfer gate controller 142 by "System A" may serve as a request to transfer data from port A to port B. In this case, System A is assumed to have presented the transfer request bit before any similar request by System B, and therefore any requests from System B are locked out or ignored. The System B reading Port B may set a different (acknowledge) bit via control circuit B 124 within the registers to allow the transfer to proceed when the System B is ready. In the preferred embodiment, memory control for both arrays is now under the addresses and control signals presented at Control Circuit A 124.

The transfer gate control logic 142 would then return a command to system A to begin refreshing Array A (i.e., sequentially activating wordlines (rows)) at some predetermined address, determined for example, by one or more bits in control register 130, and proceeding through some predetermined ending address, also for example, determined by one or more different bits in control register 130. An exemplary register map is shown in FIG. 3. As indicated above, row address incrementation and /RAS timing may be internal or external as required to step through each row. During each of these special refresh/transfer cycles, system B acts as a slave to system A receiving system A's address information and having slightly delayed (≈10 ns) sense amplifier timing to allow for the operation of the transfer gates.

It is recognized that this embodiment would require some synchronous timing between the first and second address busses. Further, other embodiments of the transfer gate circuit may be necessary as one of ordinary skill in the art would recognize depending upon the specific application intended. Additional applications may include bidirectional transfer, address translation, etc.

Figure 4:
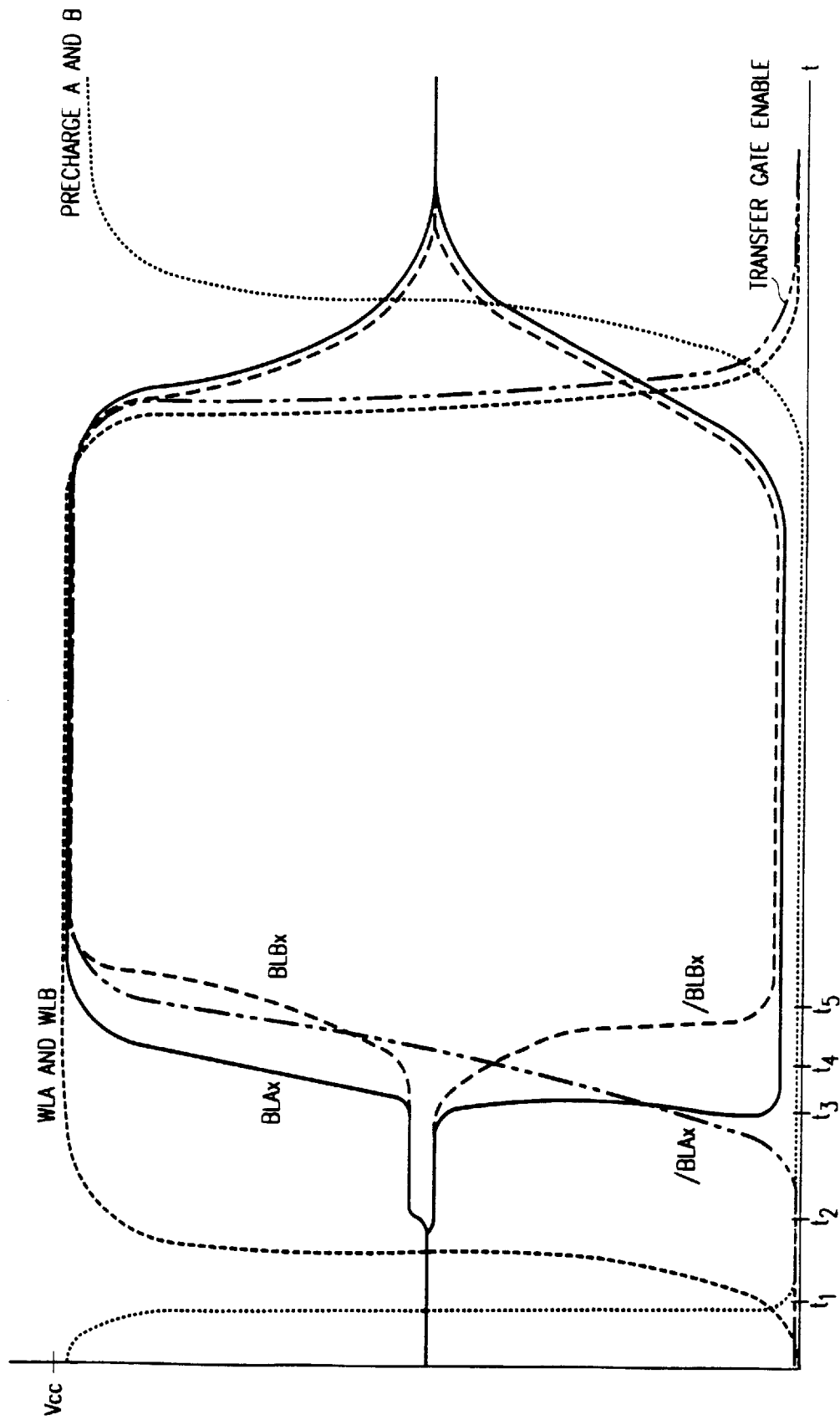
FIG. 4 is a sense amplifier timing diagram of the preferred embodiment.

As shown in FIG. 4 the timing of the row and address signals for the sending and receiving subarrays are closely tied together to optimize performance. Initiation of a transfer cycle is generally anticipated to correspond with the setting of at least one control register bit by the sending port. Arbitration is performed to ensure that the receiving subarray is idle. This may be accomplished by logically combining the sending port's request to send bit with a receiving port bit which may for example indicate that the receiving subarray is idle. The master gate control logic may then take control of both the A and B systems and execute the necessary cycles to transfer the data.

At time $t_1$, the precharge signals for both Array A Array B transition low to send both arrays into the active state from the precharge state. The precharge signals for both banks are generated in response to /RAS from the controlling system, in this case System A. At time $t_2$, the wordlines for the addressed rows in both the source array, in this example subarray A, and destination array (subarray B) are activated.

The sending subarray sense amplifiers at time $t_3$ begins charging the sending half-bitlines in response to the sensed change in charge from the cells of the selected row. In this example the voltages on BLAx and /BLAx are illustrated for discussion. If the corresponding cell for a given bitline holds high data the "true" half-bitline is charged "high" or if the cell is low the "true" half-bitline bitline is pulled low. The complementary half-bitline is correspondingly set to the complementary state For purposes of discussion, assume that the cell half-bitline BLAx carries a logic 1 and the corresponding sense amplifier begins charging BLAx and pulling down /BLAx.

After 10 ns of charging the sending bitlines, the transfer gate is closed at time $t_4$ and the receiving bitlines are connected in circuit with the sending bitlines. The sending sense amplifiers then charge both the sending and receiving bitlines for an additional 10 ns after which the receiving sense amplifier is activated at time $t_5$. At the close of the 30 ns period, all bitlines have been charged by their respective sense amplifiers and the data has been transferred simultaneously for an entire row. In the instance where more cells are required for the transfer, a new /RAS cycle is initiated, the next row is selected and the data is transferred using the same sequence discussed above. In instances where there is no transfer required, the subarrays each operate asynchronously and independently to refresh one or more rows.

It will be appreciated by those skilled in the art that each transfer moves an entire wordline's data from the sending to the receiving subarrays in a single RAS cycle. This could be up to two orders of magnitude faster than via byte by byte transfers using the column decoders Exemplary applications of memories embodying the principles of the present invention are illustrated in FIGS. 5–8, although the actual number of possible applications is more numerous. Again, for purposes of fully illustrating the principles of the present invention using the figures, the term "sending subarray" will refer to the first subarray 100 and the term "receiving subarray" will refer to the second subarray 102. It will be appreciated that a complementary operation could be illustrated as well, if the second subarray were designated the "sending array".

Figure 5:
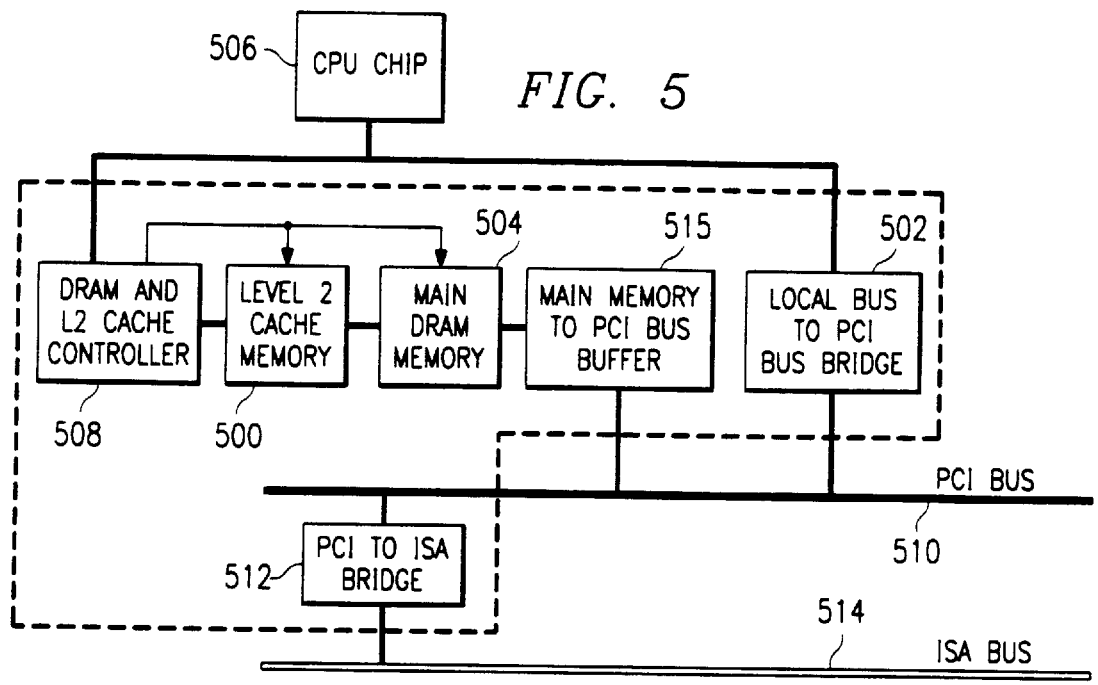
FIG. 5 is a block diagram of a core logic chip incorporating a dual port memory of the present invention.
Figure 6:
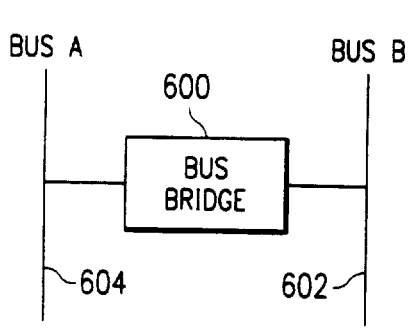
FIG. 6 is a block diagram of a bus bridge incorporating a dual port memory of the present invention.
Figure 7:
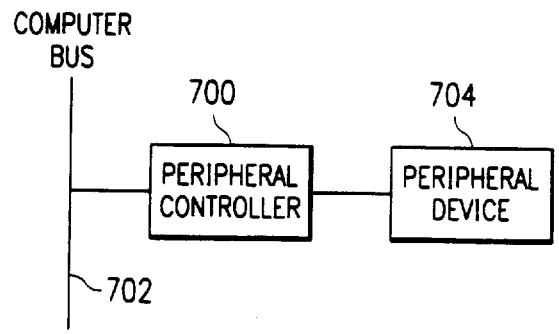
FIG. 7 is a block diagram of a peripheral device controller incorporating a dual port memory of the present invention.
Figure 8:
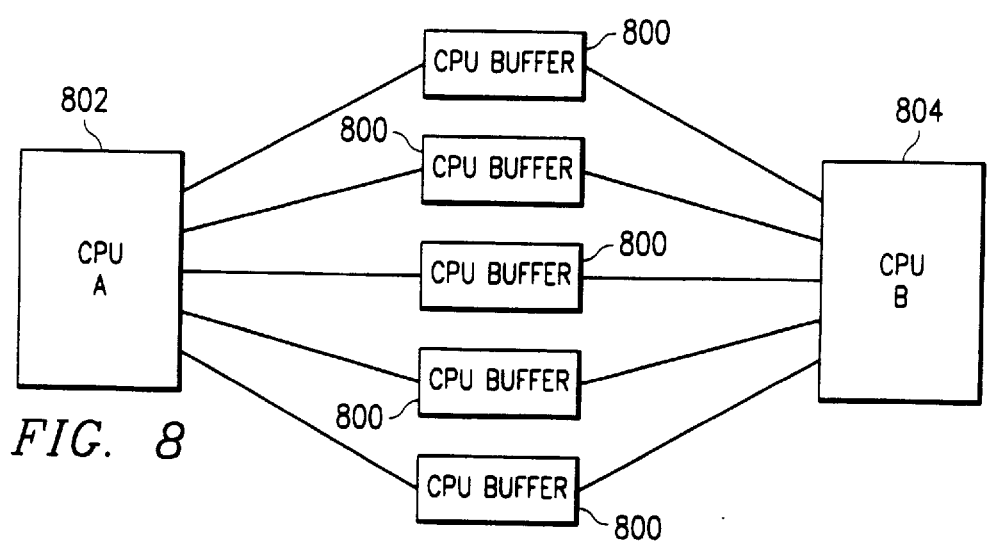
FIG. 8 is a block diagram of a dual processor buffer incorporating a dual port memory of the present invention.

FIG. 5 illustrates a preferred embodiment where the dual memory circuit of the present invention, may be incorporated into a core logic circuit. Here I/O subsystem devices of the present invention may be employed to implement level two cache 500, local bus to PCI bus bridge 502 and/or DRAM to PCI bus buffer 515.

In the case of L2 cache 500, one array 100/102 interfaces with CPU 506 and DRAM and cache controller 508, while the other interfaces with main DRAM memory 504. While the first array is operating as the actual cache for CPU 506, data can be independently brought into the second array from main memory 504. To encache the data in the second array into the first array, the CPU and/or operating system need only perform a block transfer through the transfer gate as described above. Local bus to PCI bus bridge 502 allows the CPU to essentially communicate more directly with the system peripheral devices. Main memory to PCI bus buffer 515 similarly allows the peripheral devices to more directly communicate with main memory.

In a second preferred embodiment (FIG. 6), the I/O subsystem device of the present invention is incorporated into a bus bridge circuit 600. The dual port memory may connect each data port to data leads of respective buses 602 and 604. The dual port memory would then operate in conjunction with a bridge controller circuit to transfer data between the buses.

In a third preferred embodiment (FIG. 7), the I/O subsystem device of the present invention is incorporated into a peripheral device controller 700. The dual port memory may connect between data leads of a commercial bus 702 and the data leads of a peripheral device 704. The dual port memory would then operate in conjunction with a bridge-controller circuit to transfer data between the buses.

In a fourth preferred embodiment (FIG. 8), the I/O subsystem device of the present invention is incorporated into a cache or buffer 800 for multiprocessor bus applications wherein data is stored in the cache operating between two processors 802 and 804 by allocating the first subarray 100 of the first processor 802 and a second subarray 102 to the second processor 804. The dual port memory may connect between the respective processors. The dual port memory would then operate in conjunction with a controller circuit in CPU buffer 800 to transfer data between the prospective CPU buses.

While the present invention is open to various modifications and alternative constructions, the preferred embodiments shown in the drawings are described herein in detail. It is to be understood, however, there is no intention to limit the invention to the particular form disclosed. On the contrary, it is intended that the invention cover all modifications, equivalences and alternative constructions falling within the spirit and scope of the appended claims.

What is claimed is:

1. A memory system comprising:
   a first array of memory cells;
   a second array of memory cells;
   a first parallel data input/output port for exchanging data with said first array;
   a second parallel data input/output port for exchanging data with said second array; and
   circuitry for controlling data exchanges in a selected mode with said first array via said first data port and with said second array via said second data port, said exchanges between said first port and said first array and said second port and second array being independently control by corresponding first and second sets of addresses and control signals.

2. The memory system of claim 1 wherein said circuitry for controlling exchanges comprises:

first addressing circuitry for accessing selected ones of said memory cells of said first array;
second addressing circuitry for accessing selected ones of said memory cells of said second array; and
control circuitry for directing said addressing circuitry and said first and second data ports in response to received addresses and control signals.

3. The memory system of claim 1 wherein said circuitry for controlling exchanges is further operable in a second mode to control the transfer of data from selected ones of said cells in said first array to selected ones of said cells of said second array.

4. The memory system of claim 3 wherein said circuitry for controlling comprises a transfer gate for transferring data between said selected cells of said first array and said selected cells of said second array in said second mode.

5. The memory system of claim 3 wherein each of said arrays comprises a plurality of bitlines and said circuitry for controlling includes a transfer gate for selectively transferring a charge on a said bitline of said first array to a said bitline in said second array in said second mode.

6. The memory system of claim 1 wherein said circuitry for controlling comprises:
   a first control circuit for controlling accesses to said first array, said first control circuit operating in response to a first set of addresses and control signals; and
   a second control circuit for controlling accesses to said second array, said second control circuit operating in response to a second set of addresses and control signals.

7. The memory system according to claim 1 wherein said circuitry for controlling includes:
   a first row decoder coupled to wordlines of said first array;
   a second row decoder coupled to wordlines of said second array;
   a first column decoder coupling said first data port and bitlines of said first array;
   a second column decoder coupling said second data port and bitlines of said second array; and
   an array control circuit including:
      a first array controller coupled to said first column decoder and said first row decoder; and
      a second array controller coupled to said second column decoder and said second row decoder.

8. The memory system of claim 7, said control circuit further including:
   a transfer gate controller connected between said first and second array controllers and the transfer gate for selectively coupling ones of said bitlines of said first array and ones of said bitlines of said second array.

9. The memory system of claim 4, said transfer gate including:
   at least one transistor for selectively coupling at least one said bitline of said first array and at least one bitline of said second array.

10. An I/O subsystem device comprising:
   a subsystem control circuit, said control circuit including a first control port for receiving a first set of addresses and control signals and a second control port for receiving a second set of addresses and control signals;
   first and second arrays of memory cells organized in rows and columns, each said row associated with a wordline and each said column associated with a bitline;
   a transfer gate disposed between a said bitline of said first array and a corresponding one of said bitlines of said second array, said transfer gate controlled by said subsystem control circuit;

a first parallel data input/output port for exchanging data with said first memory array;

a second parallel data input/output port for exchanging data with said second memory array; and wherein said I/O subsystem is operable in a first mode to provide independent access to said first and second arrays through said first and second data ports in response to independent sets of addresses and control signals presented at said first and second control ports and in a second mode to transfer data from selected cells of a selected one of said arrays to an other one of said arrays in response to addresses and control signals presented at a selected one of said control ports.

11. The I/O subsystem device of claim 10, wherein a memory is coupled to said second data port and said I/O subsystem device is a cache.

12. The I/O subsystem device of claim 10 wherein:

said first data port is coupled to a CPU local bus;

said second data port is coupled to a peripheral bus; and said I/O subsystem device is a bridge.

13. The I/O subsystem device of claim 10 wherein:

a system memory is coupled to a selected one of said second data ports.

14. The I/O subsystem device of claim 10 wherein:

said first data port couples to a first processor;

said second data port couples to a second processor; and said I/O subsystem is a processor bridge buffer.

15. The I/O sub system device of claim 10, wherein:

said first data port connects to an IDE controller;

said second data bus connects to a peripheral device; and said I/O subsystem device is a data buffer.

16. The I/O subsystem device of claim 15 wherein said peripheral device is a storage device.

17. The I/O subsystem device of claim 15 wherein said peripheral device is a printer.

18. An I/O subsystem device for use in a processing system having first and second buses comprising:

a subsystem control circuit operatively connected to said first and second buses;

a subsystem memory operatively connected to said subsystem controller, said first bus, and said second bus including:

a first array of memory cells having wordlines and bitlines;

a second array of memory cells having wordlines and bitlines;

a transfer gate coupled between each of said bitlines of said first array and corresponding ones of said bitlines of said second array, and coupled to said subsystem control circuitry;

a first row decoder coupled between said subsystem control circuitry and said wordlines of said first array;

a second row decoder coupled between said subsystem control circuitry and said wordlines of said second array;

a first column decoder coupled between said subsystem control circuitry and said bitlines of said first array;

a second column decoder coupled between said subsystem control circuitry and said bitlines of said second array;

a first parallel data input/output port coupled to said first column decoder for exchanging data with said first device;

a second parallel data input/output port coupled to said second column decoder for exchanging date with said second device;

said subsystem control circuitry including:

a first array controller coupled to said first column decoder and said first row decoder; and a second array controller coupled to said second column decoder and said second row decoder;

whereby said first and second array controllers selectively allow independent accesses to said first and second memory arrays in response to corresponding first and second sets of addresses and control signals during a first mode via said first and second data ports.

19. The memory system of claim 18 wherein said first and second array controllers allow independent asynchronous accesses to said first and second arrays during said first mode.

20. The memory system of claim 18 wherein a selected one of said first and second array controllers controls a data transfer from a selected one of said arrays to an other one of said arrays via said transfer gate during a second mode.

21. A method of operating of memory device including first and second array of memory cells comprising the steps of:

during a first mode:

independently accessing the first array through a first data port in response to addresses and control signals received at a first control port; and independently accessing the second array through a second data port in response to addresses and control signals received at a second control port; and during a second mode:

transferring data from bitlines of said first array to said bitlines second array in response to addresses and control signals received at a selected one of the first and second control ports said data driven from said bitlines of said fist array to said bitlines of said second array by sense amplifiers coupled to said bitlines of said first array.

22. The method of claim 21 wherein said step of transferring comprises the substeps of:

activating a wordline in the first array corresponding to a source row and a wordline in the second array corresponding to a destination row;

sensing data from a cell along the source row and latching a bitline in the first array coupled thereto to a corresponding voltage in response;

activating a transfer gate to couple the voltage on the bitline in the first array with a corresponding bitline in the second array; and sensing and latching the voltage on the bitline in the second array.

* * * * *